(12) United States Patent
Sattinger

(10) Patent No.: US 7,194,862 B2
(45) Date of Patent: Mar. 27, 2007

(54) RESONATOR ADOPTING COUNTER-BORED HOLES AND METHOD OF SUPPRESSING COMBUSTION INSTABILITIES

(75) Inventor: Stanley S. Sattinger, McDonald, PA (US)

(73) Assignee: Siemens Power Generation, Inc., Orlando, FL (US)

( * ) Notice: Subject to any disclaimer, the term of this patent is extended or adjusted under 35 U.S.C. 154(b) by 1090 days.

(21) Appl. No.: 09/963,280

(22) Filed: Sep. 26, 2001

(65) Prior Publication Data
US 2005/0166596 A1    Aug. 4, 2005

Related U.S. Application Data

(63) Continuation-in-part of application No. 09/667,409, filed on Sep. 21, 2000, now Pat. No. 6,530,221.

(51) Int. Cl.
*F02C 7/24* (2006.01)
*F01N 5/00* (2006.01)

(52) U.S. Cl. .................. 60/725; 181/212; 181/250; 181/273

(58) Field of Classification Search .................. 60/725; 181/250, 273, 276, 212
See application file for complete search history.

(56) References Cited

U.S. PATENT DOCUMENTS 2,807,931 A    10/1957    Bodine, Jr.
3,113,634 A    12/1963    Watters
3,159,238 A    12/1964    Shearer
4,199,936 A    4/1980     Cowan et al.
4,449,607 A    5/1984     Forestier et al.
4,944,362 A    7/1990     Motsinger et al.
5,373,695 A    12/1994    Algner et al.
5,590,849 A    1/1997     Pla
5,644,918 A    7/1997     Gulati et al.
5,685,157 A    11/1997    Pandalai et al.
5,975,238 A    11/1999    Fuchs et al.
6,837,050 B2 * 1/2005     Mandai et al. ............... 60/725

FOREIGN PATENT DOCUMENTS

| EP | 0576717 | 1/1994 |
| EP | 0892216 | 1/1999 |
| EP | 0892219 | 1/1999 |
| EP | 0990851 | 4/2000 |
| GB | 2309296 | 7/1997 |

* cited by examiner

*Primary Examiner*—Charles G. Freay

(57) ABSTRACT

A resonator for damping pressure waves or instabilities in a system supported by acoustic energy wherein the resonator adopts the use of counter-bored openings on the downstream side of the resonator within the flow path of the system. The resonator includes a first member and a second member where the second member includes a plurality of openings therethrough with each hole having a counter-bore on its upstream side. The first member has a size substantially smaller than the diameter of said flow path and a first plurality of openings therethrough. The openings are in fluid communication with the flow path. The second member has a size generally equal to the first member and a second plurality of openings therethrough, which openings are in fluid communication with the flow path.

14 Claims, 7 Drawing Sheets

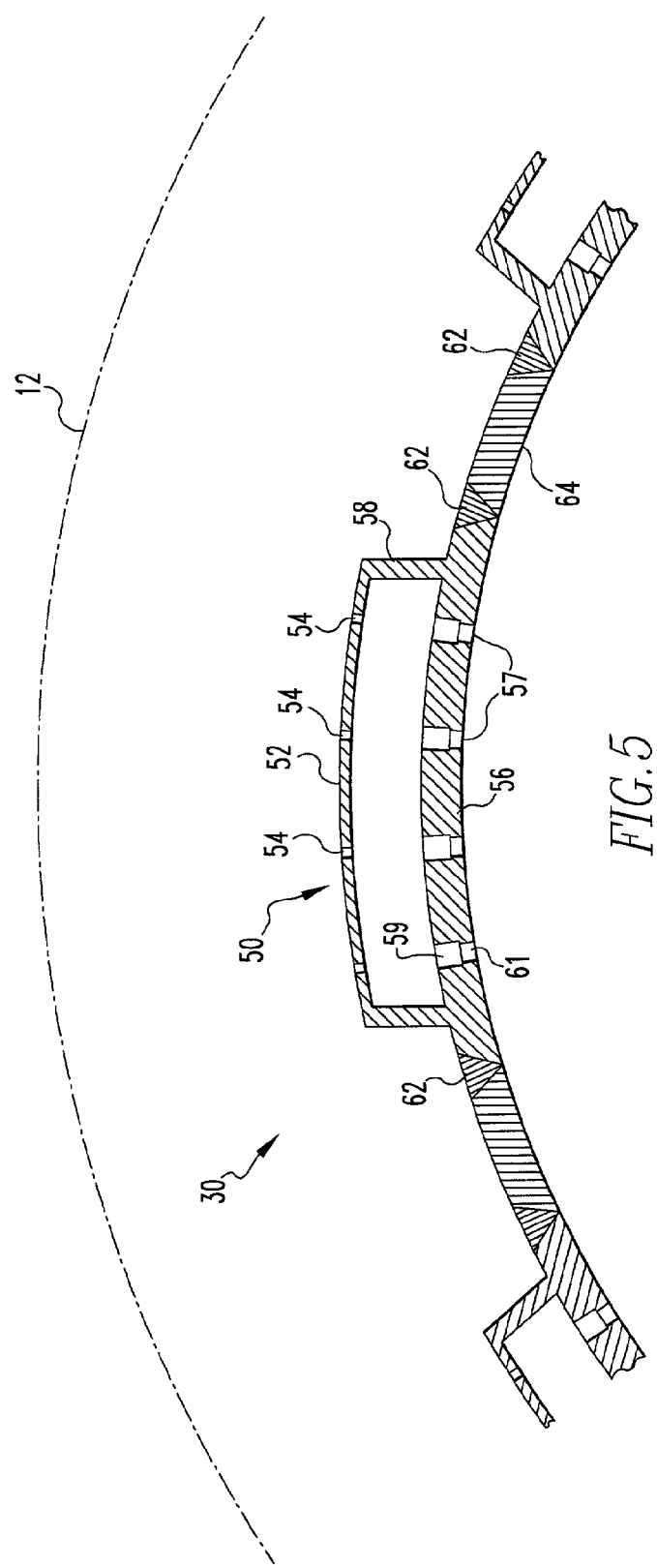

RESONATOR ADOPTING COUNTER-BORED HOLES AND METHOD OF SUPPRESSING COMBUSTION INSTABILITIES

This application is a continuation-in-part of the application having application Ser. No. 09/667,409 filed on Sep. 21, 2000 now U.S. Pat. No. 6,530,221, which is specifically incorporated herein by reference.

BACKGROUND OF THE INVENTION

This invention relates in general to a resonator for damping pressure waves or instabilities supported by acoustic energy within a system and, more specifically, to the use of counter-bored holes to increase the acoustic conductance of a resonator within a system having a combustor. The resonator may be placed at or near the location within the system having the highest acoustic pressure amplitude. This invention also relates to a method of placing a resonator adopting counter-bored holes at or near the locations of the highest acoustic pressure amplitudes within a system to suppress combustion instabilities so that the mass flow of air bypassing the system's combustor is maintained within design tolerances.

One common type of device used for damping the effects of acoustic energy is a Helmholtz resonator. A Helmholtz resonator provides a closed or blind-cavity having one sidewall with openings therethrough. The fluid inertia of the gases within the pattern of holes acts against the volumetric stiffness of the closed cavity, producing a resonance in the velocity of flow through the holes. This flow oscillation has a well-defined natural frequency and provides an effective mechanism for absorbing acoustic energy. Groups of Helmholtz resonators have been used in various types of systems to dampen pressure waves, or instabilities supported by pressure waves, that are generated within the system during operation. Examples of such systems include rockets, ramjets and gas turbine engines. More specifically, Helmholtz resonators have been used in gas turbine combustors to minimize combustion instabilities.

Pertaining to gas turbine combustors, to reduce the amount of $NO_x$ emissions from a combustion turbine power plant, it is known to provide a lean-premix fuel to the power plant's combustor. A fuel-lean premix includes a fuel premixed with a large excess of air. While the fuel-lean premix reduces the amount of $NO_x$ emissions, high frequency combustion instabilities, commonly referred to as "high frequency dynamics" or "screech oscillations," can result from burning rate fluctuations inside the combustors, which consume the fuel-lean premix. These burning rate fluctuation instabilities may create damaging pressure waves. It is desirable to provide a means of acoustic damping to suppress the acoustic energy.

Some prior art Helmholtz resonators have been in the form of monolithic liners extending over large areas of the combustion chamber walls. Such monolithic liners can be subject to high thermal stress due to the large temperature differences that may occur between the combustion chamber liner and outer walls of the combustion chamber. Monolithic liners may also be difficult to install as the components may interfere with other components of the combustion turbine power plant. Because of these conflicts, monolithic liners are typically restricted to use near the head of a combustor, which may not be the optimum location for suppressing acoustic energy. Additionally, monolithic liners are typically supported by circumferentially oriented ribs, honeycomb cells, or other means, which provide a compartmentation of the area behind the liner. These structures result in complex, sealed compartment vessel configurations that can be costly to fabricate.

Other types of resonators, such as through-flow resonators, have been placed on support plates upstream of the combustor assembly, see e.g., U.S. Pat. No. 5,373,695. Such resonators, however, are frequently placed in the available space on a cover plate, not necessarily at the location of the highest acoustical pressure amplitude. Through-flow resonators are variants on the traditional Helmholtz blind-cavity resonator. A blind-cavity resonator features a single pattern of holes enclosed on one side by a sealed enclosure. A through-flow resonator includes a second pattern of holes added to the enclosure, which is disposed on the upstream side of the first pattern of holes. This configuration admits a steady purging or scavenging flow of air through the resonator. The flow of air through the resonator permits the frequency-response bandwidth of the resonator to be broadened so that the accuracy and repeatability of frequency tuning are rendered much less critical than in the case of the blind-cavity resonator, which produces a much sharper resonance. The improved accommodation of imperfect tuning improves the likelihood of obtaining good damping performance in the face of uncertainties in temperature and other parameters. Obtaining a more blunt response characteristic improves damping performance. However, due to the length of the flow outlet holes it is difficult to obtain good damping performance when the flow outlet holes must be located in a relatively thick-walled portion of a combustor or transition section, such as those being in excess of 0.10 inch in thickness, while ensuring that the mass flow of air through the resonator stays within allowable limits.

Consequently, there is a need for a through-flow resonator that when situated within a system, such as in a thick-walled portion of a combustor, at or near the points within the system's flow path having the highest acoustical pressure amplitudes will more effectively dampen instabilities without the need for increases in the mass flow of air through the resonator, which would bypass the combustion process.

BRIEF SUMMARY OF THE INVENTION

The present invention provides a through-flow resonator, which when placed at or near the points having the highest acoustical pressure amplitudes within the flow path of a combustor system, effectively dampens instabilities from acoustic energy while avoiding an increase in mass air flow bypassing the system when a portion of the resonator is integral to a section of the system having a thickness in excess of about 0.10 inch.

The acoustic damping performance of a resonator may be expressed in terms of acoustic conductance, which is defined as the in-phase component of volume velocity through the downstream set of holes, divided by the amplitude of pressure oscillation at the downstream face of the resonator. A high value of acoustic conductance indicates high damping performance. Consequently, the higher the acoustic conductance of a resonator, the fewer individual resonators required within a system, such as a gas turbine, to minimize potentially damaging combustion oscillations, or the greater the likelihood against the occurrence of such combustion oscillations.

The natural frequency and the acoustic conductance of a through-flow resonator are governed by 1) the geometries of the upstream and downstream hole patterns 2) the enclosed volume of the resonator and 3) the steady pressure differentials across the upstream and downstream sets of holes. In a high performance resonator a much larger fraction of the total exterior-to-interior pressure drop is taken across the upstream pattern of holes than across the downstream pattern of holes, making the flow velocity and the acoustic resistance values of the upstream holes larger than those of the downstream holes. To optimize resonator performance within a combustor system, the acoustic inertance of the downstream pattern of holes also needs to be as small as possible as a function of system design and performance limits. Minimizing the acoustic inertance of this downstream hole pattern has the effect of maximizing the resonator's acoustic conductance because a relatively large resonator volume will result from tuning the resonator's natural frequency when this downstream acoustic inertance is small. A large volume in turn has the effect of isolating the flow oscillations from the high acoustic resistance, upstream flow path making the acoustic conductance large.

Because the acoustic inertance of a plain cylindrical hole, such as those commonly found in the downstream hole patterns of system resonators, is directly proportional to the hole length and inversely proportional to its cross-sectional area, design and performance tolerances of certain systems may limit the length of these holes. For example, in order to promote low emissions operation of a power plant certain gas turbine power plants restrict the rate of mass flow of air that may bypass the combustion process by flowing through a resonator. The present invention solves the problem of how to increase the acoustic conductance of a resonator in the flow path of such a gas turbine, or other systems producing acoustic energy, while ensuring that the mass flow of air bypassing the system through the resonator does not exceed design or performance limits. This is accomplished when a portion of the resonator is situated within a thick-walled portion of the turbine, or other system, and located at or near the point of highest acoustic pressure amplitude within the turbine's flow path.

One embodiment of the resonator of the present invention includes a first member having a first plurality of holes therethrough, a second member having a second plurality of holes therethrough, and a sidewall holding the second member in spaced relation to the first member. Each of the second plurality of holes includes a geometry having an upstream portion and a downstream portion where the upstream portion has a diameter that is larger than the downstream portion. The flow path of a gas within a system or resonator moves from upstream toward downstream. The upstream portion of each of these holes is counter-bored to a predetermined length, which effectively shortens the length of the original hole, which minimizes the acoustic inertance associated with the second plurality of holes. At the same time, maintaining a portion of the downstream portion of the hole at its original diameter has the effect of keeping the original hole's flow restriction, thereby maintaining the through-flow rate substantially unchanged. This downstream hole geometry is designed to make the acoustic inertance of the downstream hole pattern as small as possible without increasing the rate of mass flow of air through these holes. This has the effect of maximizing the resonator's acoustic conductance, which indicates a high acoustic damping performance.

By way of example, in one embodiment of the present invention, as used in a gas turbine combustor, the first member is located proximate the combustor assembly downstream of the combustion zone such as along the circumference of the combustor's transition section. More than one resonator may be circumferentially disposed in the transition section. The first plurality of holes in the first member are in fluid communication with a purging flow of a gas within the turbine's flow path, which is at a greater pressure than the gas in the transition section.

BRIEF DESCRIPTION OF THE DRAWINGS

FIG. 5 illustrates a cross-sectional view of one embodiment where the resonators are integral to the transition section housing.

DETAILED DESCRIPTION OF THE INVENTION

Figure 1:
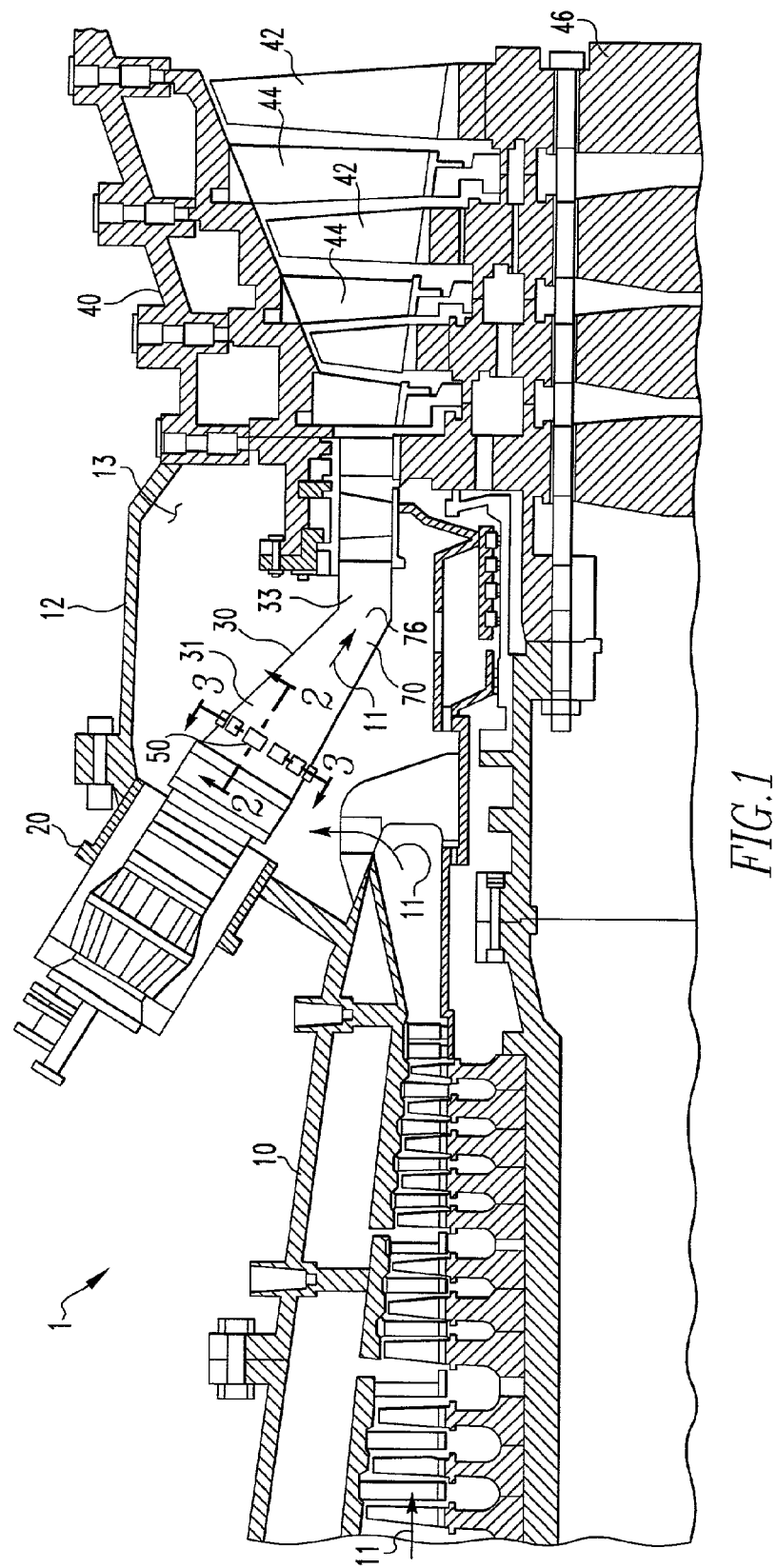
FIG. 1 illustrates a schematic cross-sectional view of a combustion turbine power plant.

As shown in FIG. 1, a combustion turbine power plant 1 includes a compressor assembly 10, a combustor assembly 20, a transition section 30, and a turbine assembly 40. The compressor assembly 10, combustor assembly 20, transition section 30, and turbine assembly 40, define a flow path 11. The combustor assembly 20 may be a can-annular or annular combustor assembly.

Figure 3:
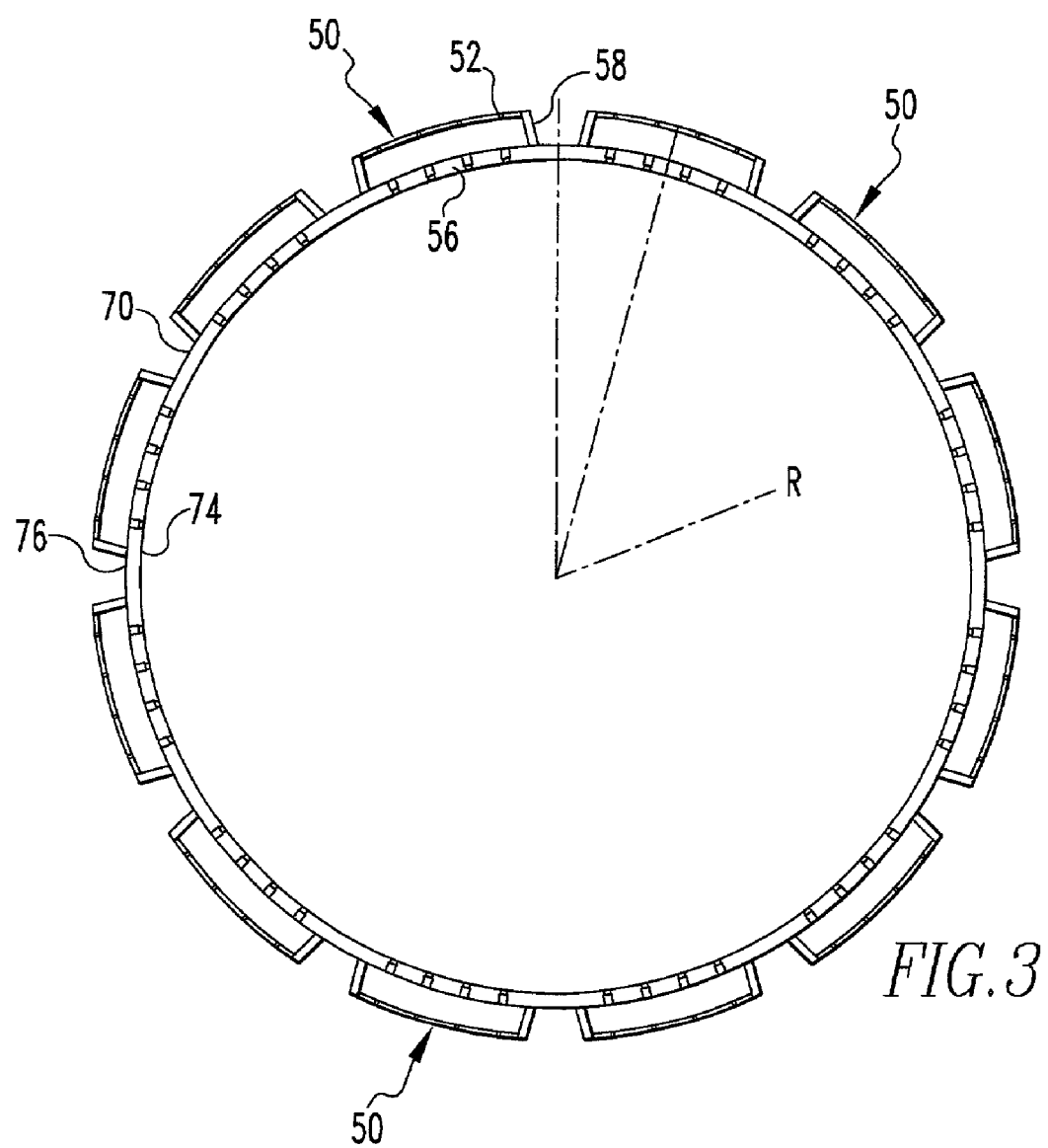
FIG. 3 illustrates a cross-sectional taken along line 3—3 of FIG. 1.

As is known in the prior art, the compressor assembly 10 includes a plurality of rotating blades and stationary vanes structured to compress a fluid. The combustor assembly 20 is disposed within a casing 12. The casing 12 defines a plenum 13. Compressed air from the compressor assembly 10 is delivered to the plenum 13. The combustor assembly 20 is coupled to a fuel source (not shown). Within the combustor assembly 20, compressed air and fuel are mixed, ignited and consumed in a combustion zone, thereby creating a working gas. The working gas is delivered through flow path 11 within the transition section 30. Transition section 30 is also disposed within casing 12 in the plenum 13. The transition section 30 includes a housing 70 having an inner surface 74, as best shown in FIG. 3, which is adjacent to the working gas, and an outer surface 76, which is adjacent to the compressed air in plenum 13. The transition section 30 has a portion with cylindrical cross section 31 and a portion with a rectangular cross section 33.

The flow path 11 extends through the transition section 30 into the turbine assembly 40. The turbine assembly 40 includes a plurality of rotating blades 42 and stationary vanes 44. As the working gas expands through the turbine assembly 40, the rotating blades 42, which are coupled to a shaft 46, formed by a plurality of rotors, rotate, thereby creating a mechanical force. The shaft 46 may be coupled to a generator, which produces power.

In operation, the compressor assembly 10 inducts ambient air and compresses the air. The compressed air is channeled through the flow path 11 to the combustor assembly 20. Within the combustor assembly 20, the compressed air is combined with a fuel and ignited. The fuel air mixture is frequently a fuel lean mixture. When the fuel is consumed in the combustor assembly 20, a working gas is formed. The working gas travels through the flow path 11 to the transition section 30, within housing 70, and is then expanded through the turbine assembly 40.

Fluctuations in the rate of fuel consumption creates a standing acoustical pressure wave, e.g. a sound wave, which extends through the flow path 11 both upstream and downstream of the combustor assembly 20. When the combustion turbine power plant 1 is in a steady state of operation, the peaks of the acoustical pressure waves are relatively stationary. To dampen the damaging effects of the acoustical wave, it is desirable to locate a damping resonator at the location of the peaks of the wave. Typically, the peak of the wave is located in the transition section 30. An exemplary embodiment of the present invention disposes at least one resonator 50 along the flow path 11 in close proximity to the combustion zone of combustor assembly 20.

Figure 2:
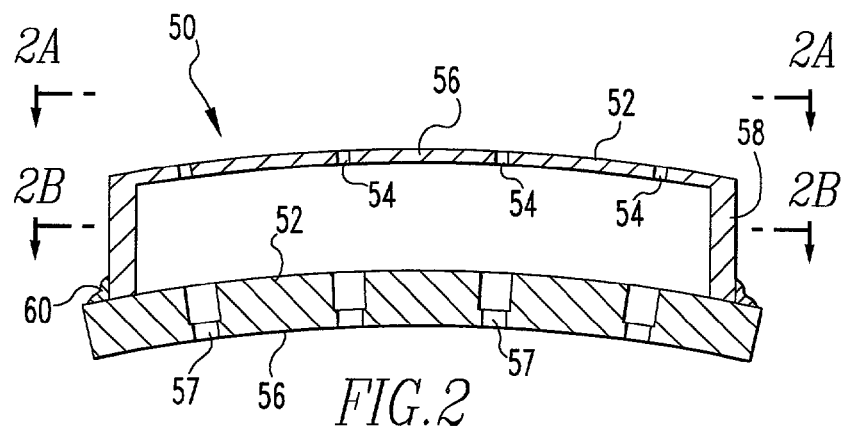
FIG. 2 illustrates a cross-sectional view taken along line 2—2 of FIG. 1.
Figure 2A:
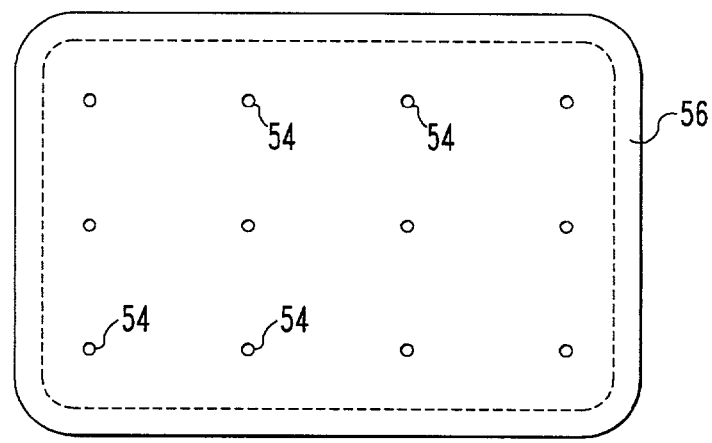
FIG. 2A illustrates a top view as indicated by line 2A—2A on FIG. 2.

As shown in FIG. 2, one embodiment of the resonator 50 comprises a first member 52 having a first plurality of openings 54 therethrough. The size of the openings 54 is first determined then the openings 54 are formed within the first member 52 in a pattern so that any two of the openings 54 have as much surface area of first member 52 as possible between them. That is, they are spaced so that the amount of surface area of first member 52 between any two of the openings 54 is maximized. An exemplary embodiment forms the openings 54 in a uniform rectangular pattern as shown in FIG. 2A. Alternative embodiments may use other patterns, such as a triangular pattern, for example. Openings 54 are in fluid communication with the flow path 11. A purging flow of compressed air from plenum 13 flows through the first plurality of openings 54, through the resonator 50, and into flow path 11 through a second plurality of openings 57 in a second member 56, shown in FIG. 2B. The compressed air in plenum 13 is at a greater pressure than the working gas within the combustion zone. The first plurality of openings 54 may be between about 0.030 inches and 0.150 inches in diameter.

In one embodiment the first member 52 is substantially smaller than the circumference of the transition section 31, as shown in FIG. 3. The second member 56 is generally in a spaced relation from the first member 52 so that a volume of air is contained between them. The second member 56 may be of any shape, such as hemispherical or cylindrical, provided that the second member 56 has a surface area substantially equal to that of the first member 52 and is held in a spaced relation by a sidewall 58. The sidewall 58 may be integral to second member 56 and extend from the peripheral edge of second member 56 in a generally perpendicular direction. The distal end of sidewall 58 is then coupled to the peripheral edge of first member 52, as shown in FIG. 3.

Figure 2B:
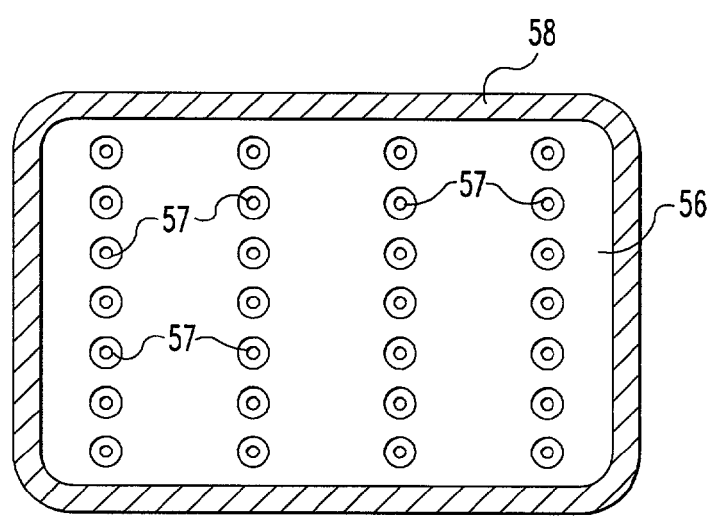
FIG. 2B illustrates a cross-sectional view as indicated by line 2B—2B on FIG. 2.

In one embodiment, as shown in FIG. 2B, the sidewall 58 surrounds all openings 57 on the second member 56. As shown in FIG. 2, the sidewall 58 may be attached to the second member 56 by a weld 60. The size of openings 57 is first determined then the openings 57 are formed in a pattern within the second member 56 so that any two of the openings 57 are spaced from each other as far as possible. That is, the surface area of second member 56 between any two openings 57 is maximized. In one exemplary embodiment, the openings 57 are distributed in a uniform rectangular pattern within second member 56. As with openings 54, alternate embodiments may form openings 57 in second member 56 in other patterns, such as a triangular pattern, for example, provided that the amount of surface area of second member 56 between any two openings 57 is maximized. The first member 52 and the second member 56 have a rectangular shape having sides between about 1.0 inches and 5 inches. Other embodiments may use other shapes having appropriate surface areas. Openings 57 are cylindrical openings having constant diameters.

Figure 4:
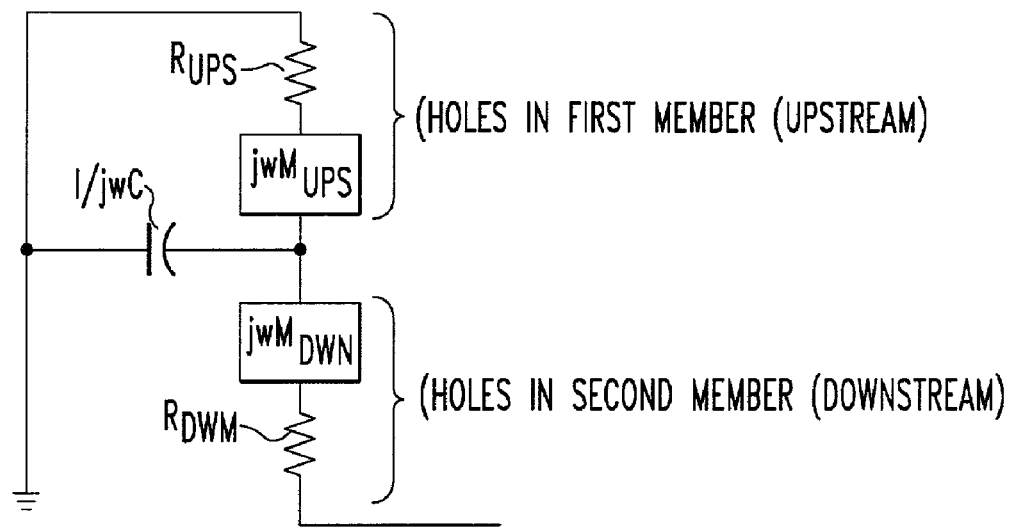
FIG. 4 illustrates an analytical model of a through-flow resonator's dynamic response.

The dynamic response of a through-flow resonator, such as resonator 50, may be analytically modeled as shown in FIG. 4. In a method of the present invention, the acoustic resistance value of first member 52 is chosen to be greater than the acoustic resistance value of second member 56. In order to maximize the acoustic conductance of resonator 50, a geometry for the second plurality of openings 57 in second member 56 is chosen to minimize the acoustic inertance associated with these openings 57. Minimizing the acoustic inertance of the second plurality of openings 57 has the effect of maximizing the resonator's acoustic conductance because a relatively large resonator volume will result when this downstream acoustic inertance is small.

Also, an upper limit for the rate of mass flow of air is determined, which is the rate permitted to flow through the resonator 50. The geometry of the second plurality of openings 57 is chosen so that this upper limit not exceeded. If the diameter of the entire length of openings 57 was simply enlarged to reduce the acoustic inertance of the openings 57 to improve damping the rate of mass flow of air would also be increased and may exceed the upper limit.

Figure 6:
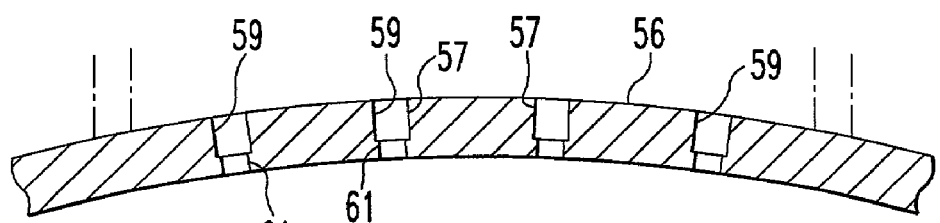
FIG. 6 illustrates a cross-section of the resonator having counter-bores.

As more clearly shown in FIG. 6, the geometry of openings 57 in second member 56 is such that each of the openings 57 has an upstream portion 59 and a downstream portion 61 wherein each portion 59 and 61 has a length and cross-sectional area defining a volume. Various geometric shapes may define openings 57. The geometry is formed to produce a first acoustic inertance associated with second member 56 that is less than a second acoustic inertance that would result if the openings 57 were cylindrical holes through second member 56.

In one embodiment, a step in forming the geometry of the openings 57 is to form them originally as cylindrical holes having constant diameters. In this respect, openings 57 are formed through second member 56 by any conventional means, such as drilling, at a predetermined diameter. This establishes a second acoustic inertance associated with openings 57. After openings 57 are formed, the upstream portion 59 is formed in each opening 57 by any conventional means, such as by counter-boring, having a predetermined diameter that is larger than the diameter of the originally formed opening 57. This reduces the second acoustic inertance associated with openings 57 to a first acoustic inertance. The diameter and length of the counter-bore, which in one exemplary embodiment is constant for each opening 57, is a function of the diameter of the originally formed holes 57, the upper limit for the rate of mass flow of air permitted to bypass the combustion system through the resonator 50 and a predetermined length of the originally formed holes 57 that will remain after the counter-bore is made to form the upstream portion 59 therein. For example, if the second member 56 has a thickness of 0.250 inches, then the formed holes 57 will have a length of 0.250 inches. A lower limit is selected for the length of the downstream portion 61 that will remain after counter-boring. The predetermined lower limit of the downstream portion 61 may range from 0.030 to 0.150 inches. Forming the counter-bore to this depth will minimize the acoustic inertance of the openings 57 while not permitting the upper limit of the rate of mass flow of air to be exceeded. Other lower limits could be selected depending on design and performance limits.

An alternate method of forming the desired geometry of the second plurality of openings 57 to minimize the acoustic inertance is to form each opening 57 at a predetermined diameter by any conventional means, such as drilling, then securing within each opening 57 a washer or other appropriate device (not shown). Such washer or insert is of a predetermined diameter and thickness with a hole having a predetermined diameter cut within its center or other appropriate location. Such washer or insert may be secured within each desired opening 57 by an appropriate securing means.

Figure 8:
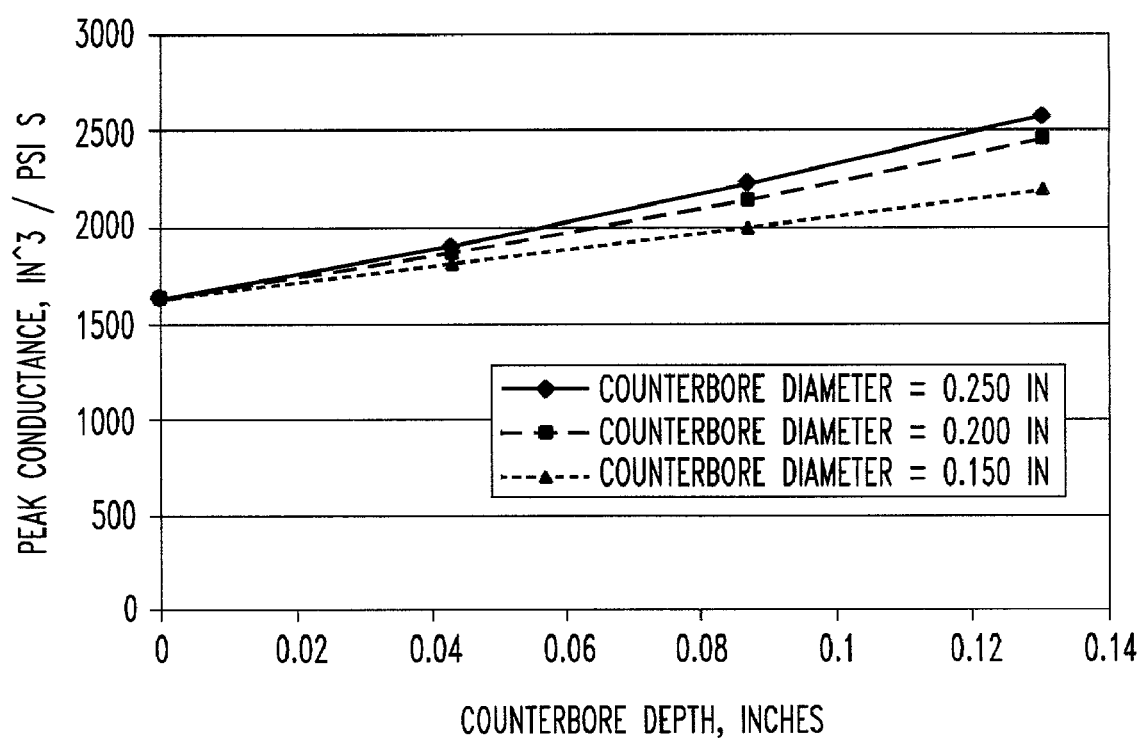
FIG. 8 is a graphical representation of resonator acoustic conductance values for various counter-bore lengths.

As shown graphically in FIG. 8, the acoustic conductance of a resonator 50 varies as a function of the counter-bore diameter and length. As can be seen in FIG. 8 the larger counterbores depth are conducive to better resonator performance.

As shown in FIG. 3, a plurality of resonators 50 may be disposed on the housing outer surface 76. In this configuration, second member 56 is integral to housing 70 and sidewall 58 extends from the housing's 70 outer surface 76 and attaches to first member 52. In one embodiment, the resonator 50 is disposed between the housing 70 and casing 12 of power plant 1 and the sidewall 58 is attached to the housing outer surface 76.

Another embodiment is shown in FIG. 5. First member 52, second member 56 and sidewall 58 may be formed integrally to form resonator 50. In this embodiment, each resonator 50 may be welded by attachment weld 62 to an attachment member 64 to form a portion of housing 70. Both the attachment member 64 and the second member 56 have a curvilinear surface, which will result in a circular transition section 30 having an appropriate cross sectional area.

In a gas turbine, the resonators 50 are most effective when disposed at or near the locations within the flow path 11 having the greatest acoustical pressure amplitudes and locations that are in fluid communication with the combustion zone. The locations having the greatest acoustical pressure amplitude are established experimentally using arrays of in-situ pressure fluctuation transducers. Alternatively, locations having the greatest acoustical pressure amplitude are established analytically using finite-element or other acoustic prediction modeling methods.

Figure 7:
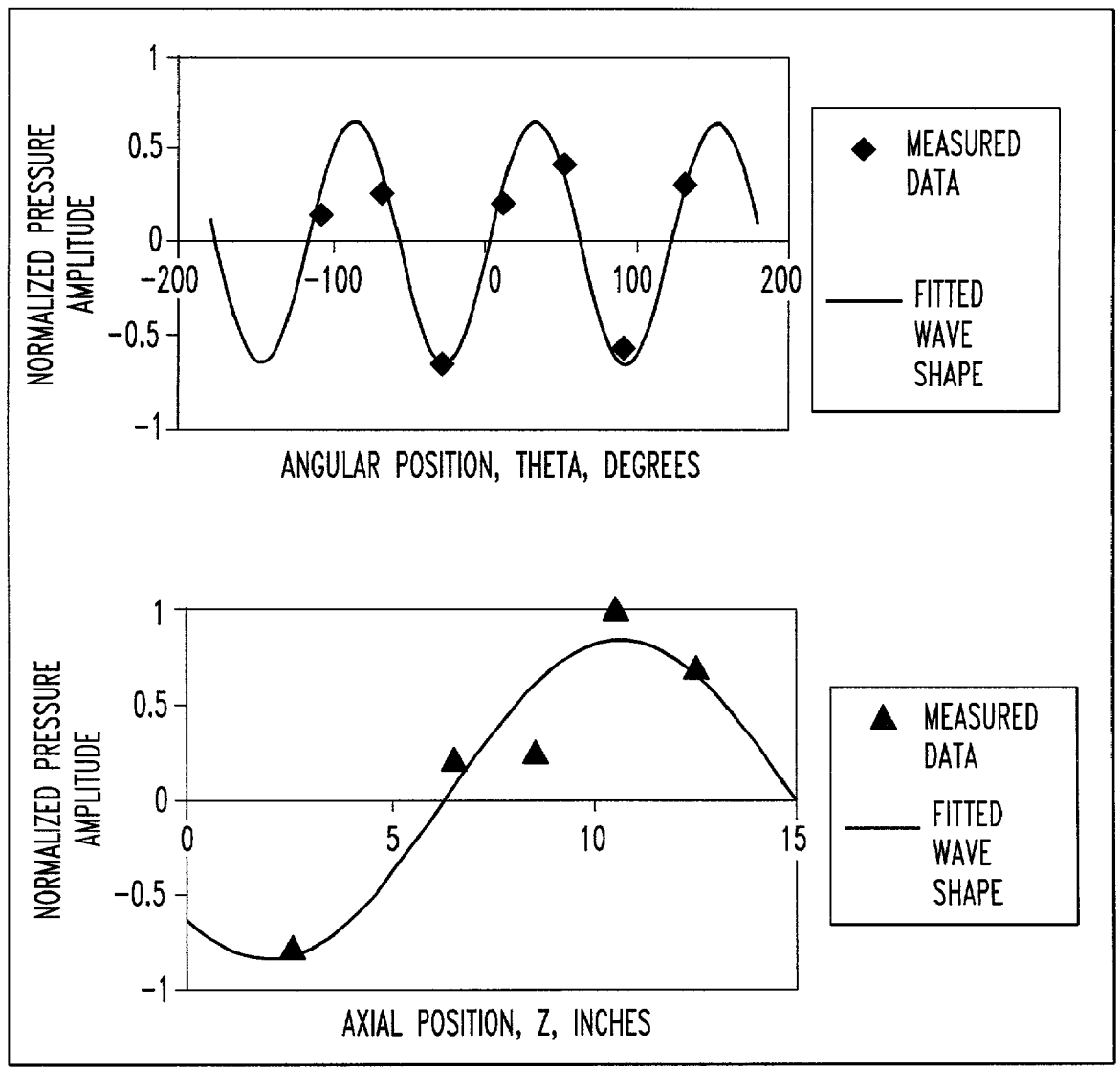
FIG. 7 is a graphical representation of the pressure wave amplitude within the transition section. The graphs represent the pressure wave amplitude compared to the angular position and the axial position.

In the case shown in FIG. 7, data, recorded from pressure fluctuation transducers, show that the greatest acoustical pressure amplitude occurs at about two inches and about eleven inches downstream of the leading edge of the transition section 30. This test was performed on a combustion turbine producing 184 MW of electrical power at a flow rate of 79,000 lb/hr of natural gas fuel. Similar analysis may be performed on other combustion systems. The data generated by this experimental procedure data indicates the distribution of the amplitude of acoustic pressure occurring at the inner surface 74 of the transition section 30 during combustion instability. This data shows that the acoustical pressure reaches peak levels at certain angular positions around the transition section 30 circumference and at an axial positions downstream from leading edge of the transition section 30. Having determined the location of the highest acoustical pressure amplitude, a plurality of resonators 50 may be attached to, or formed integrally with, transition section housing 70 proximate these locations. While individual resonators may be placed at only the angular location having the highest acoustic pressure, resonators 50 may also be spaced at intervals around the entire circumference of the housing 70 as shown in FIG. 3.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

I claim as my invention:

1. A resonator for damping pressure waves supported by acoustic energy in a system having a flow path, the resonator comprising:
    a) a first member;
    b) a first plurality of openings through the first member;
    c) a second member maintained in a generally spaced relation to the first member wherein a volume is defined between the first member and the second member and the first member is situated upstream of the second member within the flow path;
    d) a second plurality of openings through the second member, the first plurality and the second plurality of openings being in fluid communication with the flow path so that air passes through the volume;
    e) an upstream portion within each of the second plurality of openings wherein each upstream portion has a first diameter and a first length; and
    f) a downstream portion within each of the second plurality of openings wherein each downstream portion has a second diameter and a second length and wherein the first diameter is different the second diameter and the first length is different than the second length.

2. The resonator of claim 1 wherein each of the second plurality of openings is comprised of a cylindrical hole through the second member, each hole having a counter-bore forming the upstream portion wherein the first diameter is greater than the second diameter.

3. The resonator of claim 1 further comprising:
    a) a predetermined thickness for the second member; and
    b) a predetermined lower limit for the second length wherein the first length is formed so that the predetermined lower limit is not exceeded.

4. The resonator of claim 3 wherein the predetermined thickness is greater than 0.10 inches.

5. The resonator of claim 4 wherein the first diameter is between about 0.150 inches and 0.250 inches.

6. The resonator of claim 5 wherein the first length is greater than 0.040 inches.

7. The resonator of claim 1 further comprising:
    a) the first plurality of openings forming a first pattern such that a surface area of the first member between any two of the first plurality of openings is maximized by spacing the openings at a largest distance apart from each other in the first pattern; and
    b) the second plurality of openings forming a second pattern such that a surface area of the second member between any two of the second plurality of openings is maximized by spacing the openings at a largest distance apart from each other in the second pattern.

8. The resonator of claim 1 wherein the upstream portion comprises a counter-bore.

9. The resonator of claim 1 wherein the system comprises a gas turbine combustor.

10. A combustor system comprising:
a) a flow path through a combustor along which a gas passes from upstream toward downstream;
b) a resonator having a first member and a second member in generally spaced relation to each other and being in fluid connection with the flow path, the first member and second member defining a volume therebetween;
c) a first plurality of openings in the first member;
d) a second plurality of openings in the second member formed to establish a first acoustic inertance that is less than a second acoustic inertance that would be established if the second plurality of openings was formed of cylindrical holes through the second member;
e) an upstream portion having a first diameter and a first length within each of the second plurality of openings;
f) a downstream portion having a second diameter and a second length within each of the second plurality of openings;
g) the second diameter selected to limit a rate of mass flow of air passing through the resonator; and
h) the first diameter selected to be greater than the second diameter to achieve a predetermined acoustic inertance.

11. The combustor system of claim 10 further comprising:
a) a predetermined thickness for the second member;
b) a predetermined lower limit for the second length wherein the upstream portion comprises a counter-bore forming the first length so that the predetermined lower limit is not exceeded.

12. The combustor system of claim 11 wherein the combustor system is part of a gas turbine.

13. The combustor system of claim 10 further comprising:
a) an upstream portion having a first diameter and a first length within each of the second plurality of openings;
b) a downstream portion having a second diameter and a second length within each of the second plurality of openings;
c) a predetermined thickness for the second member;
d) a predetermined lower limit for the second length wherein the upstream portion comprises a counter-bore forming the first length wherein the first diameter is greater than the second diameter and the predetermined lower limit is not exceeded.

14. A resonator for damping pressure waves supported by acoustic energy in a system having a flow path, the resonator comprising:
a) a first member;
b) a first plurality of openings through the first member;
c) a second member maintained in a generally spaced relation to the first member wherein a volume is defined between the first member and the second member and the first member is situated upstream of the second member within the flow path;
d) a second plurality of openings through the second member, the first plurality and the second plurality of openings being in fluid communication with the flow path so that air passes through the volume;
e) an upstream portion within each of the second plurality of openings wherein each upstream portion has a first diameter and a first length; and
f) a downstream portion within each of the second plurality of openings wherein each downstream portion has a second diameter and a second length,
wherein the upstream portion comprises a counter-bore.

* * * * *